(12) United States Patent
Park et al.

(10) Patent No.: US 10,037,223 B2
(45) Date of Patent: Jul. 31, 2018

(54) METHOD AND SYSTEM FOR PROVIDING VIRTUAL DESKTOP SERVICE USING CACHE SERVER

(71) Applicant: ELECTRONICS AND TELECOMMUNICATIONS RESEARCH INSTITUTE, Daejeon (KR)

(72) Inventors: Jeong Sook Park, Daejeon (KR); Young Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 302 days.

(21) Appl. No.: 15/086,234

(22) Filed: Mar. 31, 2016

(65) Prior Publication Data

US 2016/0292001 A1 Oct. 6, 2016

(30) Foreign Application Priority Data

Apr. 1, 2015 (KR) ........................ 10-2015-0045981

(51) Int. Cl.
*G06F 9/455* (2018.01)
*G06F 17/30* (2006.01)

(52) U.S. Cl.
CPC .... *G06F 9/45558* (2013.01); *G06F 17/30132* (2013.01); *G06F 17/30203* (2013.01); *G06F 17/30238* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,954,718 B1 * | 2/2015 | Raj | G06F 9/45545 713/1 |
| 2011/0265083 A1 * | 10/2011 | Davis | G06F 12/0866 718/1 |
| 2014/0189035 A1 | 7/2014 | Chen et al. | |
| 2014/0317223 A1 | 10/2014 | Park et al. | |
| 2014/0324951 A1 | 10/2014 | Kim et al. | |
| 2015/0039717 A1 * | 2/2015 | Chiu | H04L 67/1097 709/214 |

OTHER PUBLICATIONS

Grannaes et al., Storage Efficient Hardware Prefetching using Delta-Correlating Prediction Tables, Nov. 1, 2011, Journal of Instruction-Level Parallelism 13 (2011) 1-16.*

* cited by examiner

*Primary Examiner* — Emerson Puente
*Assistant Examiner* — Steven Do
(74) *Attorney, Agent, or Firm* — Kile Park Reed & Houtteman PLLC (57) ABSTRACT

Provided herein is a system and method for providing a virtual desktop service using a cache server, the system including a host server configured to provide the virtual desktop service to a user's device using a virtual machine, a distributed file system configured to store data for the virtual machine, and a cache server configured to, when a request to process data reading is received from the virtual machine inside the host server, pre-read a data segment for the requested process of data reading from the distributed file system and store the pre-read data segment in a cache, and perform the process of data reading using the cache.

8 Claims, 6 Drawing Sheets

METHOD AND SYSTEM FOR PROVIDING VIRTUAL DESKTOP SERVICE USING CACHE SERVER

CROSS-REFERENCE TO RELATED APPLICATION

The present application claims priority to Korean patent application number 10-2015-0045981 filed on Apr. 1, 2015, the entire disclosure of which is incorporated herein in its entirety by reference.

BACKGROUND

Field of Invention

Various embodiments of the inventive concept of the present disclosure relate to a system and method for providing a virtual desktop service using a cache server.

Description of Related Art

A VDI (Virtual Desktop Infrastructure) system that supports virtual desktop services enables systematic storage and management of OS of virtual machines that users use, and applications and data that the users create all in a storage connected to a central server backend, and enables the users to remotely access the system using the CPU and memory resources of the host server so that they could perform necessary operations as if the system is their desktop environment.

Such a VDI system is advantageous in that it can respond to security problems such as by preventing information leakage, and can manage resources intensively. In a VDI system, however, all the I/O that a user executes require operations of inputting/outputting into/from a storage, unlike in a PC environment, and thus frequent operations of inputting/outputting into/from such a storage become the largest bottleneck section, leading to a problem that the responding performance of the system that the user senses must be supported such that it is similar to the performance when using a personal PC.

Especially, in the case a user uses an application, if an access to the storage is delayed, the performance that the user senses may deteriorate significantly compared to the PC environment, and thus such a delay must be prevented. Furthermore, operations such as boot/log in storm, and simultaneous virus scan and the like that occur at the point where most users of the VDI system start their work generate load of about 10 times that of a normal state, and thus the system must be designed to guarantee the responsiveness of the system in such a case as well.

In order to resolve the aforementioned problems, a multi-step cache structure using SSD and the like is being suggested, and a method for improving the performance by having a cache in the host server is being suggested as well. However, these are only methods for improving the cache performance for general purpose. Therefore, there needs to be an optimized structure and method where the characteristics of VDI are reflected, and in order to improve the performance of the VDI environment, a prefetching technology where the characteristics of the VDI workload are reflected may be effective. A method suggested so far is a method of preparing for a sudden rise by reading ahead in a read cache that consists of a fast medium such as SSD even before using all data predicted as necessary. However, considering the problem of the capacity of the cache, there is difficulty in pre-reading all the data.

SUMMARY

A purpose of the present disclosure is to resolve all the aforementioned problems of the conventional technology.

Another purpose of the present disclosure is to improve the response performance by providing a cache server between a host server and a distributed file system, and constituting data necessary for each situation in a virtual machine into segments, and prefetching the data segment to the cache server at a necessary point.

The representative configurations of the present disclosure for achieving the aforementioned purposes are as below.

According to an embodiment of the present disclosure, a system for providing a virtual desktop service may include a host server configured to provide the virtual desktop service to a user's device using a virtual machine; a distributed file system configured to store data for the virtual machine; and a cache server configured to, when a request to process data reading is received from the virtual machine inside the host server, pre-read a data segment for the requested process of data reading from the distributed file system and store the pre-read data segment in a cache, and perform the process of data reading using the cache.

According to another embodiment of the present disclosure, a method for providing a virtual desktop service may include prefetching, when a request to boot a virtual machine is obtained, a booting segment to a cache with reference to read distance maps for booting, each of which includes a plurality of blocks arranged in a predetermined format, each block corresponding to data for the virtual machine and including information on a block to be read next after it is read; analyzing, when a request to process reading of predetermined data is received from the virtual machine after a booting of the virtual machine is completed, whether or not the predetermined data requested is for starting an application; checking, when it is determined as a result of the analyzing that the predetermined data requested is for starting an application, in which one of the read distance maps for applications the predetermined data is provided as a block; and prefetching, when it is determined that the predetermined data is provided as a block in one of the read distance maps for applications, an application data segment corresponding to the predetermined data to a cache using the read distance map in which the block is provided.

According to the present disclosure, by providing a cache server between a host server and a distributed file system, and constituting data necessary for each situation into segments and prefetching the data segment to the cache server, it is possible to improve the response performance.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Specific structural or functional descriptions of exemplary embodiments in accordance with a concept of the present invention which are disclosed in this specification are illustrated only to describe the exemplary embodiments in accordance with the concept of the present invention and the exemplary embodiments in accordance with the concept of the present invention may be carried out by various forms but the present invention is not limited to the exemplary embodiments described in this specification.

Various modifications and changes may be applied to the exemplary embodiments in accordance with the concept of the present invention so that the exemplary embodiments will be illustrated in the drawings and described in detail in the specification. However, the exemplary embodiments according to the concept of the present invention is not limited to the specific embodiments, but includes all changes, equivalents, or alternatives which are included in the spirit and technical scope of the present invention.

Terminologies such as first or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions which describe the relationship between components, that is, "between" and "directly between", or "adjacent to" and "directly adjacent to" need to be interpreted by the same manner.

Terminologies used in the present specification are used only to describe specific exemplary embodiments, and are not intended to limit the present invention. A singular form may include a plural form if there is no clearly opposite meaning in the context. In the present specification, it should be understood that terms "include" or "have" indicate that a feature, a number, a step, an operation, a component, a part or the combination those of described in the specification is present, but do not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if they are not clearly defined in this specification.

DESIRABLE EMBODIMENTS OF THE PRESENT DISCLOSURE

Configuration of the Overall System

Figure 1:
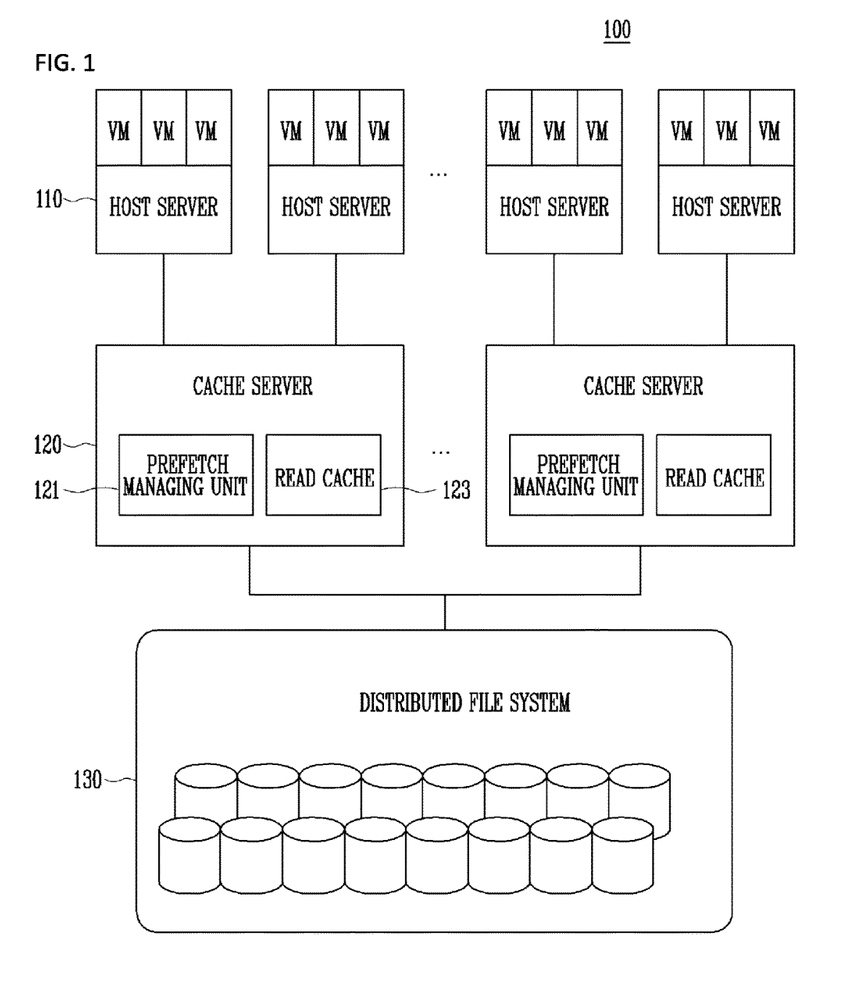
FIG. 1 is a diagram schematically illustrating the configuration of an entirety of a system for providing a virtual desktop service using a cache server according to an embodiment of the present disclosure.

FIG. 1 is a diagram schematically illustrating the configuration of an entirety of a system for providing a virtual desktop service using a cache server according to an embodiment of the present disclosure.

As illustrated in FIG. 1, an entirety of a system according to an embodiment of the present disclosure may include a host server 110, cache server 120, and distributed file system 130.

Furthermore, although not illustrated in FIG. 1, a user's device to be provided with a virtual desktop service may be included, and a communication network may be included for communication between the host server 110, cache server 120, and distributed file system 130, or for communication between the host server 110 and the user's device.

First of all, according to an embodiment, the communication network may be configured in a wired or wireless communication format of various communication networks such as a WAN (Wire Area Network), LAN (Local Area Network), mobile communication network, and satellite communication network and the like. More specifically, the communication network used in the present disclosure may include a wireless communication network configured to be realized by IEEE 802.11, CDMA (Code Division Multiple Access), WCDMA (Wideband Code Division Multiple Access), GSM (Global System for Mobile communications), LTE (Long Term Evolution) and the like. However, without limitation to the aforementioned, the communication network may include at least in one portion thereof a well known wired/wireless data communication network, well known telephone network, or well known wired/wireless television communication network.

Next, the user device according to an embodiment of the present disclosure is a digital apparatus that includes a function of communicating with the host server 110 when connected thereto. Any digital apparatus equipped with memory means and a microprocessor and thus having operating capabilities such as a desktop computer, notebook computer, workstation, PDA, web pad, mobile phone and the like may be adopted as the user device.

Next, the host server 110 according to an embodiment of the present disclosure may perform a function of providing a PC environment to a plurality of user devices that use a virtual desktop service using a virtual machine (VM). The host server 110 may be mounted with a hypervisor for supporting the operation of the plurality of virtual machines. Herein, the hypervisor refers to a software that controls approach methods of different various operating systems (OS) in various computer resources such as a processor and memory.

The host server 110 may perform a function of transmitting an input/output request provided from the virtual machine to the cache server 120, and a function of transmitting data being provided from the cache server 120 at the input/output request to the virtual machine.

Next, the distributed file system 130 according to an embodiment of the present disclosure may be a storage system for operating the virtual machine and storing data being generated in the virtual machine.

Next, the cache server 120 according to an embodiment of the present disclosure may serve as a cache for guaranteeing the response performance of the virtual machine between the host server 110 and the distributed file system 130. The cache server 120 may be located inside the host server 110, but it may instead exist as a separate independent node.

As illustrated in FIG. 1, the cache server 120 according to the present disclosure may include a prefetch managing unit 121 and a read cache 123.

The read cache 123 may be operated to guarantee the performance of read data such as I/O storm and the like, and the read cache 123 used for the purpose of the cache for performing a reading process may be an SSD. That is, the cache server 120 according to the present disclosure may operate the memory which is the fastest storage apparatus as a writing cache of a write-back method and may operate the SSD as the read cache 123 for guaranteeing the performance of reading data even in situations as I/O storm and the like.

Meanwhile, in FIG. 1, it is illustrated that the cache server 120 is provided such that it may operate in an interlocked manner with a predetermined number of host servers 110, but without limitation.

According to the present disclosure, by having the cache server 120 that includes the read cache 123, it is possible to minimize the I/O from the distributed file system 130 that is a bottleneck point of a virtual desktop service, and therefore flexibly respond to the significant increase that causes deterioration of performance of the virtual desktop service, and provide the performance that is sensed as if in a personal PC environment to all users regardless of the number of the virtual desktop service users.

However, there are limitations to loading all the data to the read cache 123 in order to minimize I/O from the distributed file system 130. That is, in order to use the cache space efficiently, it is necessary to prefetch only the data necessary for each situation such as a booting or application to the read cache 123.

According to the present disclosure, the data that the virtual machine uses is created into data segments necessary for each situation such as a booting or application (virus scan, window update, MS office/Hangul etc.), and when a predetermined situation occurs, a data segment corresponding to that situation is prefetched to the read cache 123.

Herein, the data segment according to the present disclosure may include a booting segment and an application segment. More specifically, the booting segment may be a data segment formed by obtaining a related data sequence depending on temporal locality during the first booting after installing the virtual machine. Herein, the temporal locality means that related data is all read within a certain time range.

Next, regarding the application segment according to the present disclosure, the applications used on a window OS becomes the basis, and the window application files have a common format, and thus it is possible to obtain the starting position of a certain application through a predetermined analysis. More specifically, starting an application also includes uploading related DLL (data definition language) files based on the information stored inside the application file, wherein the format of the DLL files is the same as that of the application. However, following all these semantics not only requires quite a lot of effort and time, but since DLL is a concept calling in application rather than being executed alone, and thus depending on format analysis only is quite inefficient. Therefore, in the present disclosure, it is possible to figure out the starting position of the application by the format, while constituting an application segment in consideration of the temporal locality and spatial locality by the point of executing the application as well.

According to an embodiment of the present disclosure, it is possible to constitute a map that includes information on the data segment to be prefetched in the read cache 123 depending on circumstances, and analyze the characteristics of the data requested to be read and apply the analyzed characteristics to the map, so that only the data necessary to the situation may be pre-read from the distributed file system 130 and stored in the read cache 123. Hereinafter, a map that includes information on the data segment to be prefetched to the read cache 123 depending on situations may be referred to as a Read Distance Map.

As illustrated in FIG. 1, besides the read cache 123, the cache server 120 may include a prefetch managing unit 121 for prefetching the data segment using the Read Distance Map.

When the host server 110 receives from the host server 110 a request to read data from the virtual machine, the prefetch managing unit 21 may perform control such that the data segment corresponding to the request to read is prefetched to the read cache 123 using the Read Distance Map.

Furthermore, when there does not exist a data segment on the Read Distance Map corresponding to the request to read, a function of performing a new Read Distance Map may be performed, and a function of removing data segments that are not used any longer from the Read Distance Map may be performed. That is, a function of creating and managing a Read Distance Map according to the present disclosure may be performed. Functions of the prefetch managing unit 121 according to the present disclosure will be explained in further detail hereinafter.

Hereinafter, functions of the Read Distance Map according to an embodiment of the present disclosure will be explained in further detail.

Figure 2:
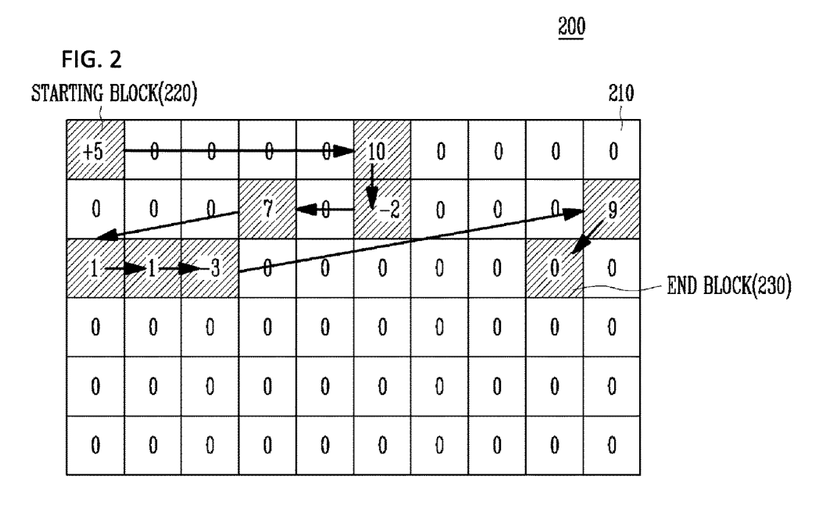
FIG. 2 is a conceptual diagram illustrating in detail a Read Distance Map according to an embodiment of the present disclosure.

FIG. 2 is a conceptual diagram illustrating in detail a Read Distance Map according to an embodiment of the present disclosure.

As illustrated in FIG. 2, the Read Distance Map 200 according to the present disclosure may be an arrangement of blocks of data, especially of blocks 210 of a n×m matrix format. Herein, each of the blocks 210 may include information on a block to be read after it (the current block) is read.

More specifically, in the case where a request to read is transmitted at a certain point, the block that is read first in the Read Distance Map 200 becomes the starting block, meaning the block where the data segment starts. That is, it is possible to obtain information on data segments to be prefetched while following along the blocks inside the Read Distance Map 200 with reference to the information included in each of the blocks 210, and upon reaching the end block having information of 0, the data segment may end. That is, when there is no blocks left to move to, the pathfinding in the Read Distance Map 200 for finding the data segment to be prefetched may end.

Referring to FIG. 2, for example, the block that corresponds to reference numeral 220 in the Read Distance Map 200 is number 0 block, and based on an assumption that the closer to the right, the number of the block increases by one sequentially, number 0 block that is the first block to be read becomes the starting block 220 that forms a predetermined data segment. Next, since number 0 block that is the starting block 220 includes information '+5', the second block that forms the predetermined data segment becomes number 5 block that is the block proceeded by 5 blocks from number 0 block. Next, since number 5 block that is the second block includes information of '+10', the third block that forms the predetermined data segment becomes number 15 block that is the block proceeded by 10 blocks from number 5 block. Next, since number 15 block that is the third block includes information '−2', the fourth block that forms the predetermined data segment becomes number 13 block that is 2 blocks backwards from number 15 block. In the same method until reaching the end block 230 via the fifth and sixth blocks, it is possible to obtain information on a predetermined data segment along the blocks 210 inside the Read Distance Map 200. Herein, the sequence of the blocks forming the predetermined data segment is 'number 0→number 5→number 15→number 13→number 20→number 21→number 22→number 19→number 28', and an aggregation of data corresponding to each block may be a data segment.

Figure 3:
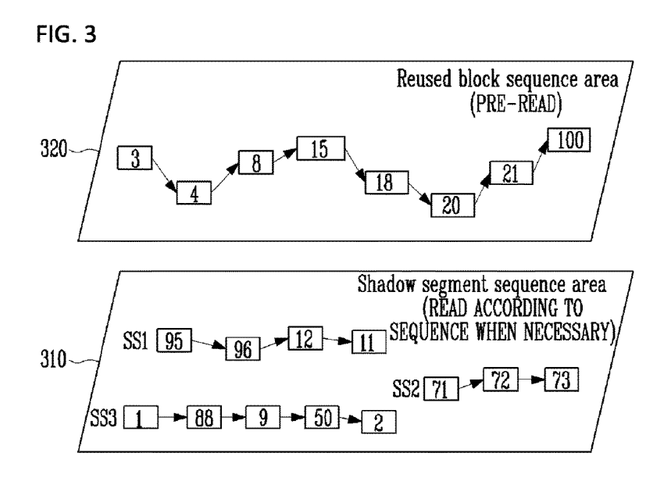
FIG. 3 is an application of a Read Distance Map according to an embodiment of the present disclosure, that is, a conceptual diagram illustrating a data segment being created with reference to at least one of temporal locality and spatial locality.

FIG. 3 is an application of a Read Distance Map according to an embodiment of the present disclosure, a conceptual diagram illustrating a data segment being created with reference to at least one of temporal locality and spatial locality.

FIG. 3 is an application of a Read Distance Map according to an embodiment of the present disclosure, a conceptual diagram illustrating a data segment being created with reference to at least one of a temporal locality or spatial locality.

Since it is not easy to figure out a context or session of a predetermined data in the cache server 120 as in the virtual machine (although it is easy to determine the start of a booting since it is fixed), when it is determined that the data of a certain point is a start of an application, all the data coming in during a period predetermined by applying the temporal locality may be regarded as the same segment. Furthermore, spatial locality may be applied to the data that different segments have in common, and then this data may be preloaded to the read cache 123 regardless of whether or not it will be used in the future so that it may be utilized instead of a context or session.

That is, as illustrated in FIG. 3, a Read Distance Map according to the present disclosure may include a first area 310 (shadow segment sequence area) where data segments according to temporal locality are expressed and a second area 320 (reused block sequence area) where data segments according to spatial locality are expressed. In the first area 310, a plurality of different segments may be formed for each situation, and the data commonly used in numerous situations may be formed in a single data segment in the second area 320 so that it may be prefetched to the read cache 123 in advance during an OS booting regardless of whether or not it is being used currently.

Figure 4:
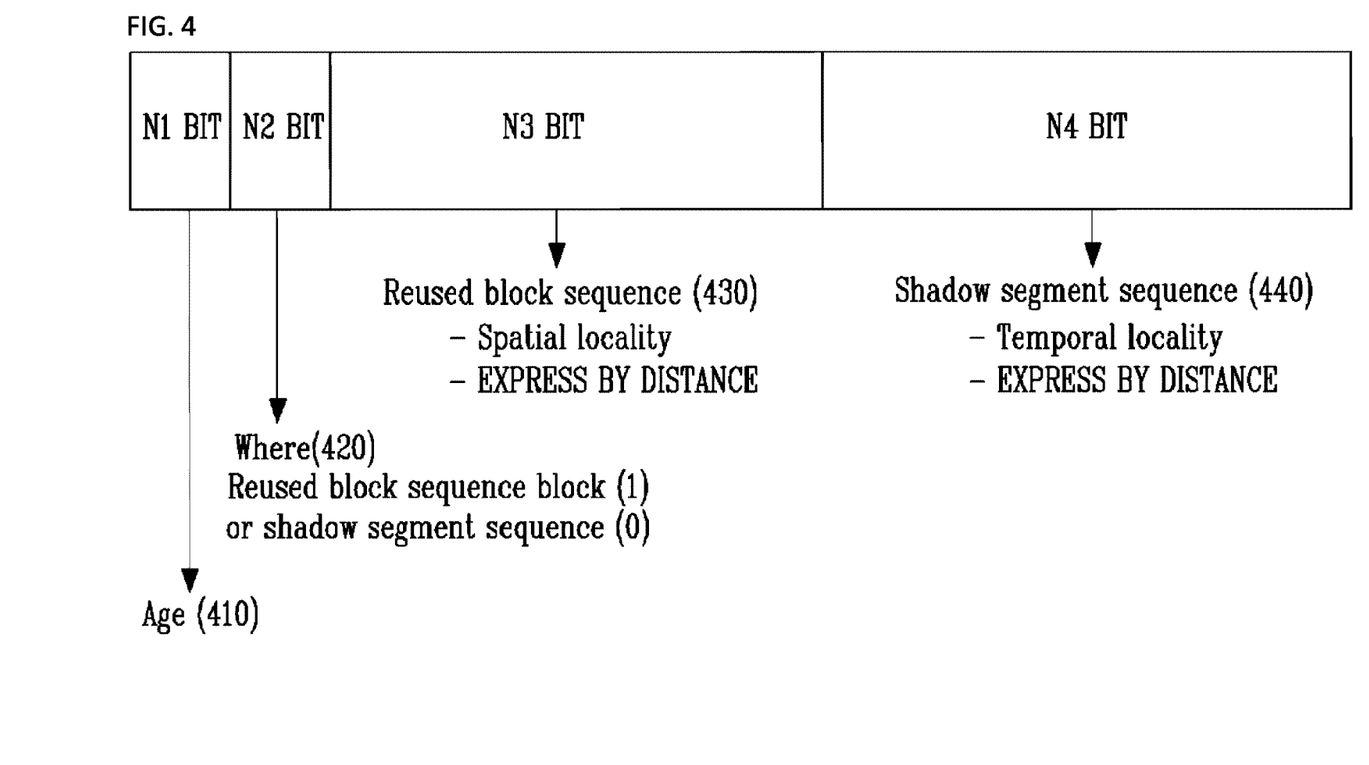
FIG. 4 is a diagram illustrating a structure of data included in each of the blocks of a Read Distance Map according to an embodiment of the present disclosure.

FIG. 4 is a diagram illustrating a structure of data that includes each of the blocks of a read distance according to an embodiment of the present disclosure.

As illustrated in FIG. 4, the data corresponding to each of the blocks of the Read Distance Map may include first to fourth information.

First of all, first information 410 may mean 'Age' information. Even a data segment constituted based on temporal locality and spatial locality according to the present disclosure may include meaningless data or data not to be used any more after it is used several times. As such, any data that is not to be used any further needs to be excluded from the data segment, and whether or not to maintain the data in a data segment or to exclude it from the data segment may be determined based on an 'Age' value.

More specifically, the 'Age' value is set as a predetermined value (for example, 3) when using a block for the first time, and then at every rebooting or predetermined interval, whether or not to reuse the 'Age' value is examined so as to increase or decrease the 'Age' value. Herein, when the 'Age' value becomes 0, it is excluded from the data segment. The process of examining whether or not to reuse data (or block) based on the 'Age' value will be explained in detail with reference to FIG. 7 hereinafter.

Next, second information 420 may be information on 'Where', that is, a value indicating whether the corresponding block is displayed on the first area or the second area of the Read Distance Map. That is, it may indicate whether the corresponding block forms the data segment according to temporal locality or the data segment according to spatial locality.

Next, the third information 430 relates to a value expressed as a data segment by spatial locality (reused block sequence), which may include information on a block sequence to be displayed on the second area. The reused block sequence may be expressed as a single segment, and the blocks based on spatial locality may be sequentialized in an ascending order per position. Furthermore, the blocks displayed on the second area indicate blocks approached by two or more temporal localities.

Lastly, the fourth information 440 may relate to a value to be expressed as a segment by temporal locality (shadow segment sequence), and this fourth information 440 may include a plurality of segments. Meanwhile, the third information 430 and fourth information 440 may be expressed by distance.

Figure 5:
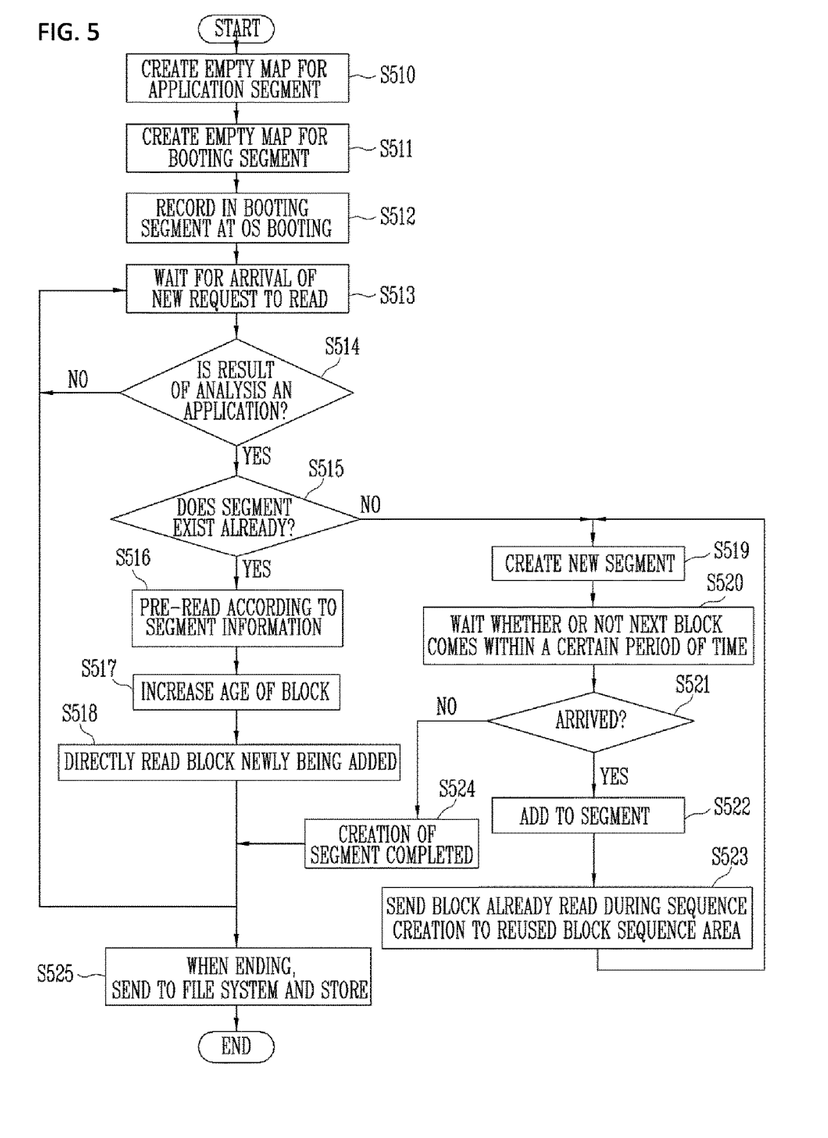
FIG. 5 is a flowchart illustrating the overall flow of constituting a data segment for each situation using a Read Distance Map and prefetching a predetermined data segment using the same during an initial booting and operation of a virtual machine according to an embodiment of the present disclosure.

FIG. 5 is a flowchart illustrating the overall flow of constituting data segments for each situation using a Read Distance Map according to an embodiment of the present disclosure, and prefetching a predetermined data segment using the same.

First of all, as illustrated in FIG. 5, in order to create a Read Distance Map for booting segment and for application segment, it is possible to create an empty map for application segment (S510), and create an empty map for booting segment (S511), respectively.

Next, when an OS booting is proceeded, the data used during the OS booting may be recorded in an empty map for booting segments (S512).

After a Read Distance Map for booting segment is created as the booting is completed, application segments may be created and managed by analyzing the data requested to be read.

More specifically, when a new request to read has arrived (S513), it is possible to analyze whether the data requested is just simple data or data meaning a start of an application, and when it is determined as a result of the analyzing (S514)

that the data does not mean a start of an application, the process may return to the step of waiting for a new request to read (S513).

On the other hand, when it is determined as a result of analyzing the data requested (S514) that the data means a start of an application, it is possible to inspect the Read Distance Map to check whether or not the block corresponding to the data requested is a block that constitutes a predetermined data segment (S515).

When it is determined as a result of the Read Distance Map inspection that there already is a data segment on the Map, it is possible to prefetch data corresponding to the data segment from the distributed file system to the cache server with reference to the sequence information obtained according to the block of the Read Distance Map (S516). In this case, the 'Age' value of the blocks that form the data segment may be increased by one each (S517). Furthermore, when the request to read data includes a request to read any data that is not in the data segment, the data may be directly read from the distributed file system 130 (S518).

Meanwhile, when it is determined as a result of analyzing data upon request (S514) that the data is regarded as meaning a start of an application but a result of a Read Distance Map inspection shows that there is no data segment on the Read Distance Map, it is possible to create a new data segment on the Read Distance Map (S519). Herein, creating a new data segment on the Read Distance Map may mean recording location information of the block corresponding to the requested data as the starting block.

Next, after the new data segment is created (S519), it is possible to wait whether or not a request to read a next block is received during a predetermined period of time (S520). When such a request to read a next block is received within a predetermined period of time (S521), the block may be added to the new data segment (S522), and an already read block of among the blocks constituting the segment may be transferred to the second area (reused block sequence area) (S523). Then, it is possible to wait for another predetermined period of time whether or not a request to read a next block is received (S520). According to the present disclosure, the process of creating a new data segment and then adding a block received during a predetermined period of time to the new data segment may be repeated until there is no further request to read a next block. That is, when there is no further request to read, it is possible to finish creating a new data segment (S524), and then go to the step of waiting for a new request to read (S513).

The aforementioned processes may be repeated when the OS of the virtual machine is being operated, and the Read Distance Map files created according to the aforementioned processes may be stored in the distributed file system 130 at the end step of the system (S525).

Figure 6:
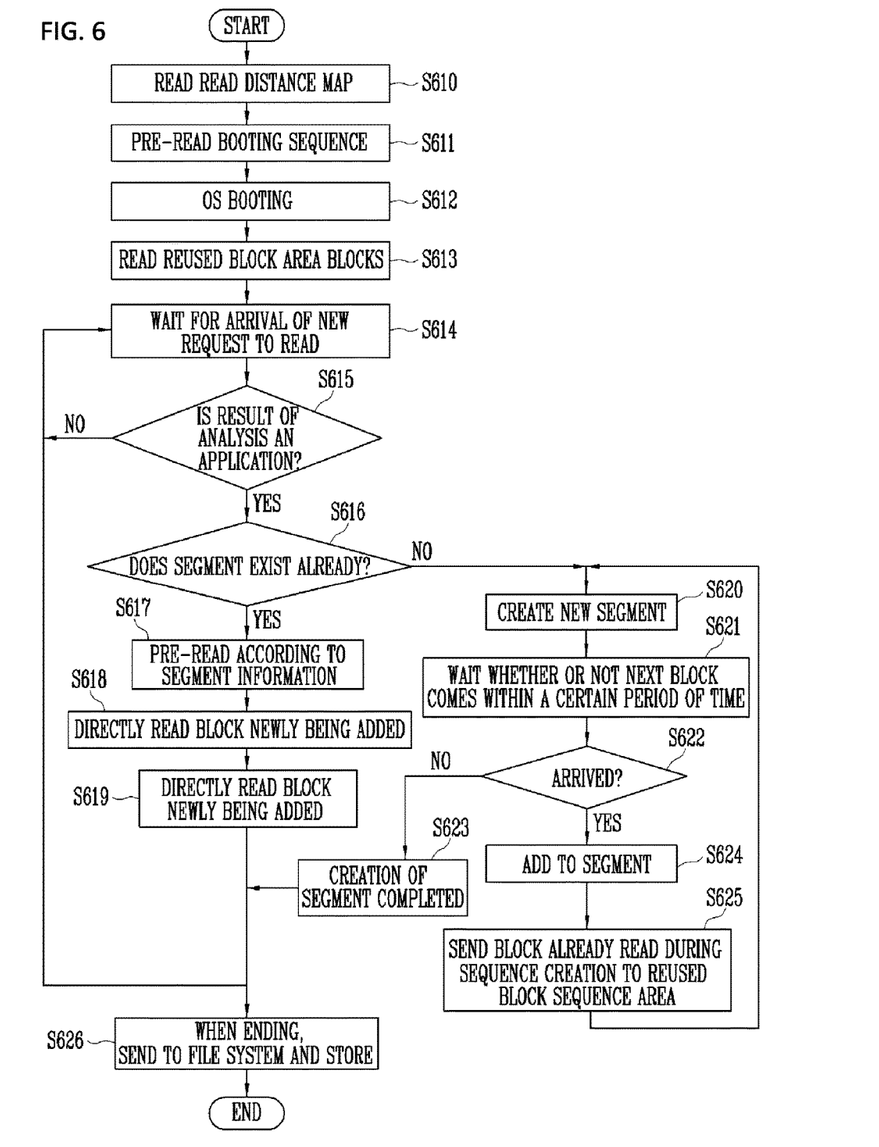
FIG. 6 is a diagram illustrating the overall flow of utilizing a data segment for each situation using a Read Distance Map after an initial booting and operation of a virtual machine according to an embodiment of the present disclosure.

FIG. 6 is a diagram illustrating the overall process of utilizing a data segment per situation using a Read Distance Map according to an embodiment of the present disclosure after an initial booting and operation of the virtual machine.

When Read Distance Maps are formed at an initial booting and operation of the virtual machine as explained hereinabove with reference to FIG. 5, at subsequent bootings and operations, data segments may be created and managed using those Read Distance Maps.

That is, as illustrated in FIG. 6, when a request to reboot the virtual machine is received from the user, it is possible to read the Read Distance Map for booting segment (S610). It is possible to obtain data segment information for a booting with reference to the Read Distance Map, and perform a pre-reading of booting sequence data based on the data segment information obtained (S611), while at the same time performing OS booting (S612).

Next, when the booting is completed, a data segment formed by the blocks stored in the second area (reused block sequence area) of the Read Distance Map that different applications use in common is prefetched to the cache server regardless of whether or not it is currently being used (S613). Thereafter, a process of analyzing characteristics of newly received read data to create or manage the data segment for application may be performed, but since this process is the same as the process explained hereinabove with reference to FIG. 5, detailed explanation will be omitted.

Figure 7:
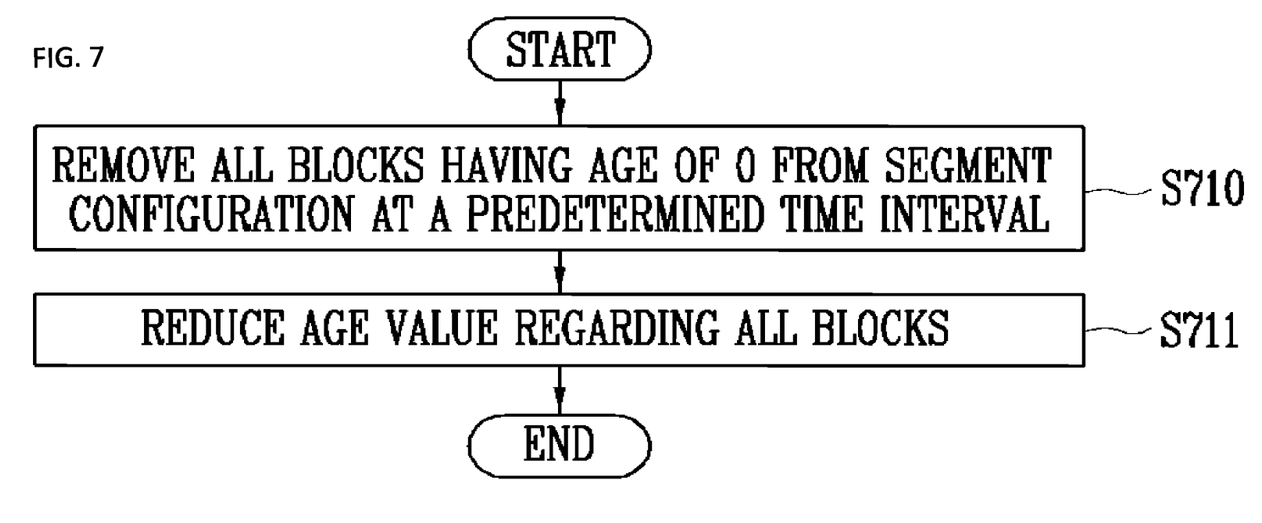
FIG. 7 is a flowchart illustrating a process in which a created data segment is managed according to an embodiment of the present disclosure.

FIG. 7 is a flowchart illustrating a process in which a data segment is managed according to an embodiment of the present disclosure.

A data segment created according to an embodiment of the present disclosure or the blocks constituting each of those data segments may have different positions or may not be used as time goes by. Therefore, it is necessary to check whether or not each data segment is being used continuously.

For this purpose, in the present disclosure, it is possible to perform a step of checking the 'Age' value included in each of all the blocks that constitute a Read Distance Map at a predetermined interval, and have the blocks with the 'Age' value of 0 removed from the Read Distance Map, as illustrated in FIG. 7 (S711).

After the blocks having the 'Age' value of 0 are removed from the Read Distance Map, the 'Age' value corresponding to each of the remaining blocks may be reduced by one each (S712). That is, only the blocks that are used continuously can be stored and managed in the Read Distance Map.

Exceptionally, however, in the case where an access has not been made with reference to the latest access information for a long period of time, the step of removing the blocks having the 'Age' value of 0 from the Read Distance Map or the step of reducing the 'Age' value of the blocks may not be performed even after a predetermined interval has passed.

According to the present disclosure, by having the read cache 123 that consists of a fast medium such as an SSD/memory and the like between the host server 110 and the distributed file system 120, and by prefetching only the data necessary for a certain situation in preparation for cases where massive I/O is instantaneously needed from the distributed file system 120 at the point of executing an application such as simultaneous booting/log-in, virus scanning, window update, and MS office/Hangul, it is possible to maximize the speed of response to a user's service request while using the space of the read cache 123 efficiently.

That is, unlike the conventional technologies that randomly load all the data to a cache without predicting data usage, according to the present disclosure, it is possible to improve the efficiency of using cache and obtain a fast response performance.

The aforementioned embodiments of the present disclosure may be realized in formats of program commands that may be performed through various computer components and recorded in a computer readable record medium. The computer readable record medium may be a program command, a data file, or a data structure or an combination thereof. The program commands to be recorded in a computer readable record medium may be ones that have been specifically designed and configured for the present disclosure or ones that are well known to those skilled in computer software areas and are thus available. Examples of computer readable record media include magnetic media such as hard disks, floppy disks, and magnetic tapes; optical recording media such as CD-ROMs and DVDs; magneto-optical media such as floptical disks; and hardware apparatuses specially configured to store and perform program commands such as ROMs, RAMs, flash memories and the like. Examples of program commands include not only machine language codes such as those made by compilers, but also high-level language codes that may be executed by a computer using an interpreter and the like. Such a hardware apparatus may be configured to operate as one or more software modules for performing the processes of the present disclosure, and vice versa.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present disclosure as set forth in the following claims.

What is claimed is:

1. A system for providing a virtual desktop service, the system comprising:
    a host server configured to provide the virtual desktop service to a user's device using a virtual machine;
    a distributed file system configured to store data for the virtual machine; and
    a cache server configured to, when a request to process data reading is received from the virtual machine inside the host server, pre-read a data segment for the requested process of data reading from the distributed file system and store the pre-read data segment in a cache, and perform the process of data reading using the cache;
    wherein the cache server obtains information on the data segment from read distance maps each of which includes a plurality of blocks arranged in a predetermined format, each block corresponding to the data for the virtual machine and including information on a next block in the predetermined data segment to be read after a current block is read; and
    wherein each of the blocks provided in the read distance maps comprises:
    i) first information indicating reusability of each block, ii) second information indicating, when each block is a block constituting the data segment, whether the data segment is based on temporal locality or spatial locality, iii) third information indicating a value expressed as the data segment based on the spatial locality where the special locality represents the offset value to the next block read, and iv) fourth information indicating a value expressed as the data segment based on the temporal locality.

2. The system of claim 1,
    wherein the data segment is at least one of a booting segment and an application segment, and
    the cache server determines whether the request to process data reading received from the virtual machine is for a booting or for an application, and uses the read distance map corresponding to a result of the determination.

3. A method for providing a virtual desktop service, the method comprising:
    prefetching, when a request to boot a virtual machine is obtained, a booting segment to a cache with reference to read distance maps for booting, each of which includes a plurality of blocks arranged in a predetermined format, each block corresponding to data for the virtual machine and including information on a next block in the predetermined data segment to be read after a current block is read;
    analyzing, when a request to process reading of predetermined data is received from the virtual machine after a booting of the virtual machine is completed, whether or not the predetermined data requested is for starting an application;
    checking, when it is determined as a result of the analyzing that the predetermined data requested is for starting an application, in which one of the read distance maps for applications the predetermined data is provided as a block;
    prefetching, when it is determined that the predetermined data is provided as a block in one of the read distance maps for applications, an application data segment corresponding to the predetermined data to a cache using the read distance map in which the block is provided; and
    wherein each of the blocks provided in the read distance maps comprises:
    i) first information indicating reusability of each block, ii) second information indicating, when each block is a block constituting the data segment, whether the data segment is based on temporal locality or spatial locality, iii) third information indicating a value expressed as the data segment based on the spatial locality where the special locality represents the offset value to the next block read, and iv) fourth information indicating a value expressed as the data segment based on the temporal locality.

4. The method of claim 3,
    further comprising, when the booting being an initial booting of the virtual machine, creating a booting segment that refers to data being used at the initial booting in one of empty read distance maps.

5. The method of claim 3,
    further comprising, when it is determined that the predetermined data requested is not provided as a block in one of the read distance maps for applications, creating an application data segment for the predetermined data in one of empty read distance maps.

6. The method of claim 3,
    wherein a data segment for re-use that different data segments use in common is prefetched before receiving the request to process reading of the predetermined data from the virtual machine after the booting of the virtual machine is completed.

7. The method of claim 3,
    wherein an age value of the blocks corresponding to the data segment prefetched to the cache is increased.

8. The method of claim 7,
    wherein the age values of the blocks of the read distance maps for booting and of the read distance maps for applications are checked at every predetermined period of time, and any block having an age value of 0 is removed from the read distance maps for booting or the read distance maps for applications.

\* \* \* \* \*